Patented May 10, 1949

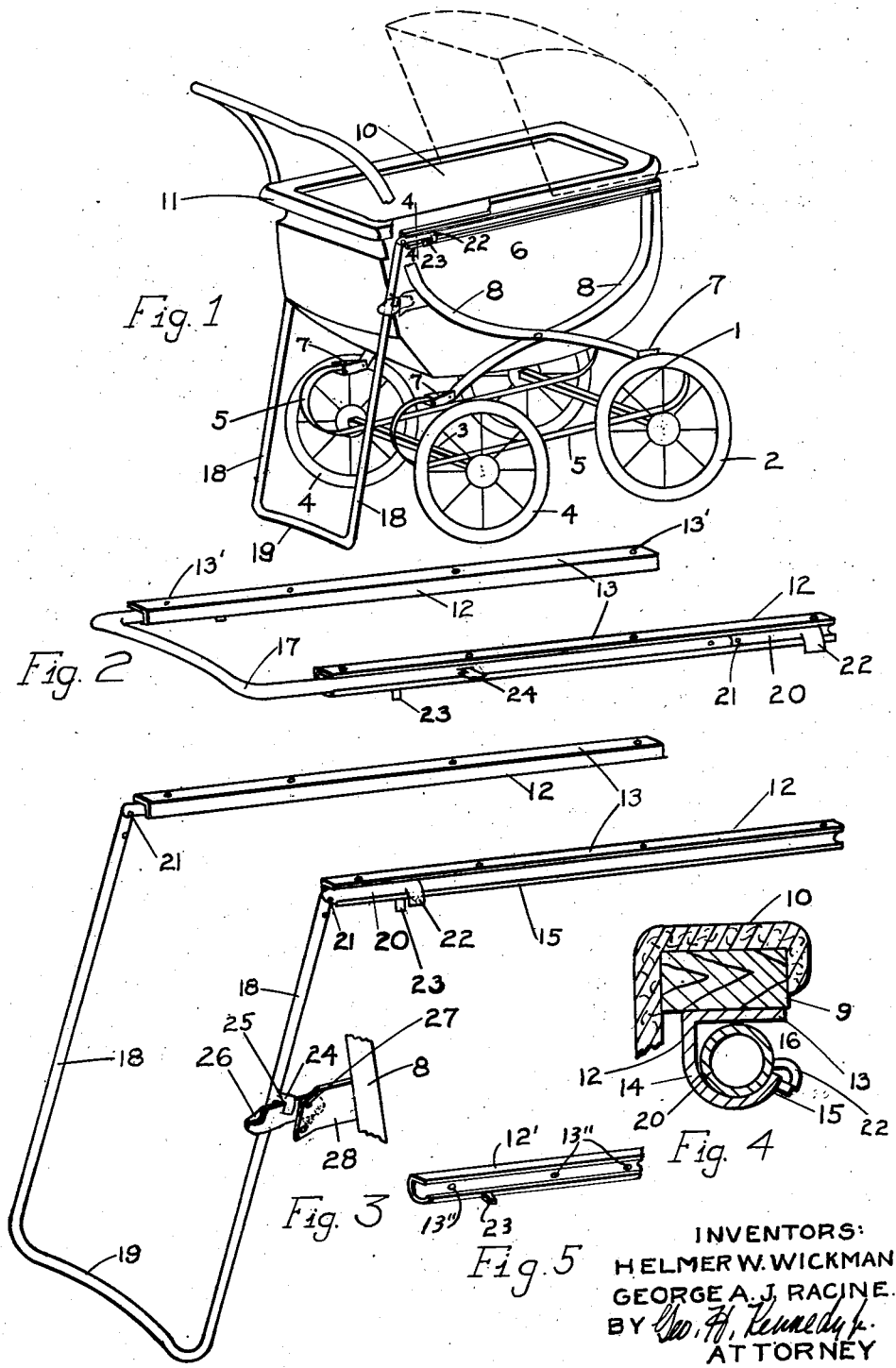

2,469,909

UNITED STATES PATENT OFFICE 2,469,909

ANTITIP CONSTRUCTION FOR BABY CARRIAGES

Helmer W. Wickman and George A. J. Racine, Gardner, Mass., assignors to Heywood-Wakefield Company, Gardner, Mass., a corporation of Massachusetts Application November 17, 1945, Serial No. 629,210

6 Claims. (Cl. 280—47)

1

This invention relates in general to baby carriages, and in particular to an improved safety or anti-tip construction therefor, by which to insure against the carriage being tipped or turned over backwards (or the fulcrum afforded by ground contact of its rear wheels) when the occupant's weight is shifted to and/or concentrated at the extreme rear and usually overhanging end of the carriage body.

Heretofore, the so-called safety legs or struts, intended to prevent such overturning of a baby carriage, have been mounted on the running gear or chassis beneath the carriage body, with provision for being moved down (usually in response to setting of the brakes) to engage the ground somewhat behind the points of rear wheel contact with the ground; however, the limitations imposed by such method of mounting on the length and rearward reach of an anti-tip leg or strut are such that the carriage is still susceptible to being tipped over backward on the fulcrum afforded by the ground contact of a so-mounted leg, and the comparative ease with which this overturning can take place is contributed to in most cases by the up and down movements which the carriage body is free to have on its supporting springs, in response to rapid and violent movements of the occupant, when standing or kneeling at the extreme rear portion of said body.

Our invention corrects this and other shortcomings of previous anti-tip or so-called safety legs for baby carriages, by a construction and arrangement of parts which is adapted to stabilize the carriage body itself rather than the running gear, and which obtains ground contact when in operative position, at a point far enough back, in all cases and under all conditions, to prevent the carriage from turning over backwards.

Other and further objects and advantages of the invention will be made apparent in the following detailed description thereof, reference being had in this connection to the accompanying illustrative drawings, in which Fig. 1 is a perspective view of a baby carriage, equipped with our improved anti-tip device and showing the latter in its operative position.

Fig. 2 is a perspective view, on a larger scale than Fig. 1, showing said anti-tip device apart from the carriage and in its retracted or inoperative position.

Fig. 3 is a view similar to Fig. 2 showing said anti-tip device, as drawn out, dropped down, and latched in its operative or ground-contacting position.

Fig. 4 is a large scale fragmentary sectional view, the section being taken substantially in the vertical plane of the line 4—4 of Fig. 1.

Fig. 5 discloses a modified form of our invention which comprises a strip 12' which is adapted to be secured at each side of the carriage body 6.

Like reference characters refer to like parts in the different figures.

Fig. 1 shows a baby carriage having running gear and body of substantially conventional construction. The running gear comprises a front axle 1 carrying ground wheels 2, 2 and a rear axle 3 carrying ground wheels 4, 4, the two axles being connected together and held in parallel spaced relation by the usual elongated leaf springs 5, 5 extending lengthwise of the carriage on each side. The upwardly and inwardly curved ends of said springs provide a cushion support for the carriage body 6, said spring ends as here shown having the usual shackle connections 7, 7 for the attachment thereto on each side of the carriage of a pair of body-supporting links 8, 8. In the carriage shown by Fig. 1, which is of the folding type, with a collapsible body 6, the links 8, 8 are crossed, and are arranged to support or suspend the body 6 by connection of their outer upper ends to a substantially rectangular frame 9 of wood or other suitable material that runs around the upper edge of the body 6, with the sides and ends of the body depending downwardly from this supporting frame 9. Said sides and ends of the body 6 are lined or covered interiorly with any suitable upholstered fabric or material, as indicated at 10, this material being shown as extended outwardly to cover over and give a finished appearance to the sides and ends of the body frame 9, which forms, as shown, an ornamental out-turned rim or flange 11 around the body's upper edge.

Our invention contemplates an anti-tip safety stand or strut of sufficient length to reach, as hereinafter described, from the carriage body's rear edge to the ground, and the above described overhang along the body's sides of such a rim or flange 11, however it may be formed, affords a convenient and out-of-the-way place for the accommodation and storage of a member of such length, when not in use; however, our invention is not limited in this respect, since the device, as shown in Fig. 5, can as well be carried against the body's sides, instead of on the underside, as shown in Fig. 1, of the flange or rim 11. The rim portions which overhang the two sides of the body 6 are used, as shown in Fig. 1, for the attachment of a pair of elongated strips 12, each preferably of the cross sectional shape shown in Fig. 4. Each strip 12 provides a substantially flat upper section 13, which may be apertured as shown at 13' for the passage of screws or the like securing the strip to the under surface of a side portion of the frame 9. The strip material extends downwardly to form a curved trough-like section 14, the free edge of which, as shown at 15, is upturned and terminates somewhat short of the opposite side of the flat upper section 13. Thus, the two strips 12, 12 running underneath the sides of the body rim 11 provide a pair of spaced longitudinal guides, each open along one side, as shown at 16, said guides being arranged to receive, and to support for sliding movement lengthwise of body 6 our elongated safety stand whose strut portion 17, as here shown, consists of a single piece of metal tubing bent into a substantially U-shaped form, that is, with two parallel side sections 18, 18 and an intermediate transverse section 19.

At the free end of each elongated section 18 is provided a relatively short hinged section 20, preferably of the same tubular stock, each section 20 being joined to its associated section 18 by a hinge or pivotal connection shown at 21, which permits rocking between said sections on a transverse axis. The stock of at least one of said hinged sections 20 is deflected at the end of said section, as shown at 22, to provide a tongue which extends through the side opening 16 of the associated guide strip 12, and for cooperation with such tongue 22, the guide strip 12, near its rearward end, is formed with a projecting stop 23, lying in the path of the tongue 22 and adapted to be struck by said tongue when our safety stand 17, from its telescoped position within the guides 12, 12 (see Fig. 2) is pulled out far enough (see Fig. 3) to carry its hinges 21, 21 clear of the rear ends of said guides; under these conditions the U-shaped strut member 17 is rendered free to swing on the transverse axis provided by the hinges 21, 21, so as to drop down by gravity into the operative or anti-tip position shown by Fig. 1. In this position a lug 24 on one of the sections 18 engages with a notch 25 provided in the edge of a spring latch 26 pivoted at 27 to a bracket 28 projecting from one of the body supporting links 8, thereby to lock the stand 17 in the operative position shown by Fig. 1. In order to return said safety stand to its inoperative or telescoped position within the guides 12, the latch 26 has to be depressed by rocking it about its pivot 27, thereby freeing the lug 24 from the notch 25 and allowing the stand 17 to be swung upwardly on the axis of hinges 21 to a horizontal position, and then pushed forwardly into the guides, as shown in Fig. 2.

The stability afforded by our anti-tip construction is far greater than that afforded by the previous devices of this class which have been attached to the running gear rather than to the body of the carriage. This increase of stability is due to the fact that the engagement of our safety stand with the ground is well in the rear of the center of gravity of the carriage, and also because of the fact that it forms a strut for the body itself, by which to substantially immobilize said body, notwithstanding the latter's support on the usual springs. This eliminates any possibility of the carriage being overturned by violent movements of the occupant, when standing or kneeling at the rear portion of the body.

Our device, despite its length, is adapted to be carried as above described in an out-of-the-way and substantially concealed position, when not in use; such position, however, enables it to be put into use very readily, without requiring any stooping over on the part of the operator. The operator needs only to seize the device, as by its transverse portion 19, and pull it out to the limit of rearward movement, as determined by engagement of lug 22 with stop 23; thereupon with release of the operator's hold, the device drops by gravity to operative position (Figs. 1 and 3) by swinging movement on its hinges 21, 21 which only become active to permit such movement, when drawn out of the guide members 12, 12 by the above-described rearward movement of our device. In the final portion of said downward gravity swing, our device, by engagement of its lug 24 with the notch 25 of latch 26 becomes positively locked in operative position, and incapable of being released therefrom by either a forward or a backward movement of the carriage; release from such operative position can only occur by depression of latch 26, which permits our device to be swung upwardly on the hinges 21, 21 and then pushed forwardly into the guide members 12, 12.

In the form of our invention shown by Fig. 5, the construction and operation of the anti-tip strut or stand 17 is precisely as described above, the only difference being in the location on the carriage body 6 of the channel-like strips 12' that slidably receive the side or leg portions 18, 18 of the strut member. The modified form of carriage, unlike the body 6 of Fig. 1, is not provided with any overhanging or outturned rim or flange, such as shown at 11 in Fig. 1. Under these conditions, the strips 12', instead of being apertured in the manner shown at 13' in Figs. 2 and 3, are apertured in their vertical portions as at 13'' for the passage of holding screws that secure the strips to the sides of the carriage body. In all other respects, the modified form of carriage is substantially the same as the device shown in Figs. 1 to 4, inclusive.

We claim:

1. In a baby carriage, the combination with running gear, a carriage body, and spring means for resiliently supporting said body on said running gear, of a safety device including an elongated strut pivotally mounted at one end thereof at the upper portion of said carriage body, said strut being adapted to be swung upwardly about its pivotal mounting into an inoperative position and to be swung downwardly to its operative position so as to depend from said carriage body for engagement with the ground thereby substantially to immobilize said spring means, and means for releasably maintaining said strut in both its operative and inoperative positions.

2. In a baby carriage, the combination with running gear, a carriage body, and spring means for resiliently supporting said body on said running gear, of a safety device including a substantially U-shaped strut having each of its two free ends pivotally mounted at the upper portion of a respective one of the sides of said carriage body, said strut being adapted to be swung upwardly about its pivotal mounting into an inoperative position and to be swung downwardly to its operative position so as to depend from said carriage body for engagement with the ground thereby substantially to immobilize said spring means, and means for releasably maintaining said strut in both its operative and inoperative positions.

3. In a baby carriage, the combination with running gear, and a carriage body resiliently supported upon said running gear, of a safety device including a substantially U-shaped strut having each of its two free ends pivotally mounted at a respective one of the sides of said carriage body, said strut being adapted to be swung downwardly about its pivotal mountings to its operative position so as to depend from said carriage body for engagement with the ground, means for releasably locking said strut in its ground-engaging position, and means disposed adjacent each side of said carriage body for telescopically receiving and supporting the free ends of said strut along with their pivotal mountings so that said strut, when not in use, may be manually shifted into a body-encircling relation with said carriage.

4. In a baby carriage, the combination with running gear, a carriage body having an outwardly projecting rim extending about the upper edge portion thereof, and spring means for resiliently supporting said body on said running gear, of a safety device including a substantially U-shaped strut having each of its two free ends pivotally mounted at the upper portion of a respective one of the sides of said carriage body, said strut being adapted to be swung downwardly about its pivotal mountings to its operative position so as to depend from said carriage body for engagement with the ground thereby substantially to immobilize said spring means, means for releasably locking said strut in its operative position, and means disposed directly beneath said projecting rim and adjacent each of the carriage body sides for telescopically receiving and supporting the free ends of said strut along with their pivotal mountings so that said strut, when not in use, may be manually urged to a concealed position directly beneath said rim.

5. In a baby carriage, the combination with running gear, and a carriage body resiliently supported upon said running gear and having an outwardly projecting rim extending about the upper edge portion thereof, of a safety device including a substantially U-shaped strut formed so as to be snugly received, when not in use, about the upper rear portion of said carriage body in a concealed position directly beneath said rim, guide means for telescopically receiving and supporting said strut beneath said rim so that said strut may be pulled away from said carriage body and clear of said guide means, hinge elements connected with the free end portions of said strut for affording a pivotal connection between said strut and said guide means whenever said strut is pulled clear of the latter, said strut being adapted, when clear of said guide means, to pivot downwardly under gravity force about said hinge elements so as to depend from said carriage body for engagement with the ground, and means for releasably maintaining said strut in its ground-engaging position.

6. In a baby carriage, the combination with running gear, and a carriage body resiliently supported upon said running gear and having an outwardly projecting rim extending about the upper edge portion thereof, of a safety device including a substantially U-shaped strut, a pair of guide elements each disposed lengthwise of a respective one of the carriage body sides and directly adjacent and beneath said rim for telescopically receiving and supporting said strut in a concealed position beneath said rim whenever said strut is not in use, a pair of hinge elements supported by said guide elements and each being pivotally connected to a respective one of the free end portions of said strut and adapted to be carried to the end portion of its associated guide element by a retractile movement of said strut relative to said carriage body, thereby freeing the outer end of said strut for a downward movement about said hinge elements so that said strut may depend from said carriage body for engagement with the ground, means for limiting the retractile movement of said hinge elements, and means for releasably maintaining said strut in its ground-engaging position.

HELMER W. WICKMAN.
GEORGE A. J. RACINE.

REFERENCES CITED

The following references are of record in the file of this patent:

UNITED STATES PATENTS

| Number | Name | Date |
| --- | --- | --- |
| 1,032,607 | Ingalls | July 16, 1912 |
| 2,402,332 | Flynn | June 18, 1946 |

FOREIGN PATENTS

| Number | Country | Date |
| --- | --- | --- |
| 464,805 | France | Jan. 22, 1914 |